F. ECAUBERT.
COUPLING.
APPLICATION FILED JAN. 5, 1916.

1,265,889.

Patented May 14, 1918.

Inventor
Frederic Ecaubert
By his Attorneys

UNITED STATES PATENT OFFICE.

FREDERIC ECAUBERT, OF BROOKLYN, NEW YORK.

COUPLING.

1,265,889.  Specification of Letters Patent.  Patented May 14, 1918.

Application filed January 5, 1916. Serial No. 70,465.

*To all whom it may concern:*

Be it known that I, FREDERIC ECAUBERT, a citizen of the United States, residing in the borough of Brooklyn, city of New York, in the county of Kings and State of New York, have invented certain new and useful Improvements in Couplings, of which the following is a full and clear specification.

My invention relates in general to flexible connections for couplings by which torque may be transmitted from one member to another. In its broader aspects, the term coupling in the present case, is intended to include a shaft which is in effect a plurality of couplings joined together.

The object of my invention is primarily to provide an improved construction of couplings in which the connected parts need not be or remain in straight axial alinement with each other, but may assume different angular positions with respect to each other, while retaining the mechanical engagement of the working parts. Such a construction is shown for example, in my prior application, filed March 9th, 1914, Serial Number 823,543, and the present application constitutes a simplified form of the construction therein illustrated.

The particular improvements contemplated in the present application reside in the construction and arangement of the shell by which the adjacent ends of two intermeshing members are externally secured together, and in the internal abutment and construction of the toothed ends of the shaft sections.

Examples of the improved constructions are shown for purely illustrative purposes in the accompanying drawing, in which,—

Figure 1:
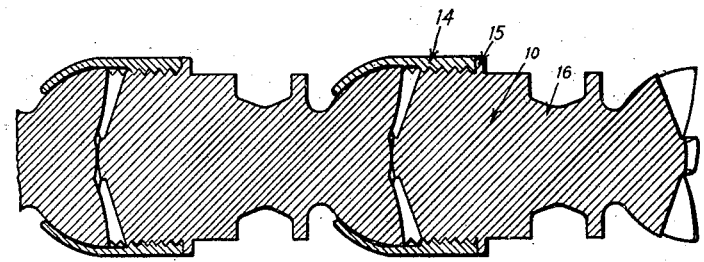
Figure 1 is a longitudinal section through a plurality of connected shaft sections which may be regarded as a portion of a flexible shaft constructed according to the present invention.
Figure 3:
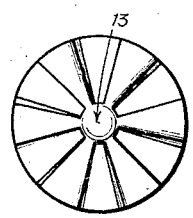
Fig. 3 is a face view of the end of one of the shaft sections.
Figure 2:
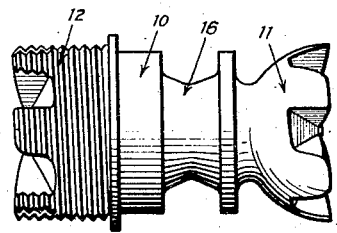
Fig. 2 is a detail external view of one of the forms of double ended shaft sections such as illustrated in Fig. 1, wherein the coupling sleeve or shell is secured to one end of the shaft section by screw threading.

Referring more in detail to said drawing, the shaft link shown in Figs. 1, 2 and 3, comprises a stem portion 10 having a toothed end 11 of spherical external curvature and a toothed end 12 of screw-threaded cylindrical external form. The toothed ends 11 and 12 are in the form of crown gears of peculiar construction with rounded axial abutment nubs 13 from which the spaces between the teeth increase in depth radially outward, while the teeth themselves are extended axially a greater distance, taken from the center toward the periphery. This construction permits continued engagement of adjacent nubs 13 while leaving the connected members capable of assuming different angular relations to each other. The threaded portion 12 receives the internally threaded coupling shell 14 which is screwed down against a stop flange 15 formed on the shaft section 10. The other end of the coupling shell 14 is wrought into conformity with and made to embrace the spherical outer surface of the toothed end 11 of an adjacent segment or section. The shell 14 thus constitutes in effect an external bearing of the spherical end 11, at the same time securing together the adjacent sections and permitting them to assume different angular positions with respect to each other, while still maintaining their proper coöperative engagement for transmitting torque. An annular groove 16 may be provided around the stem 10 to adapt the sections to the reception of balls or other bearing members if an inclosing casing is to be employed, in the manner illustrated in my prior application above mentioned.

The threaded connection of the shell 14 with shaft section 10 provides for the ready removal of a defective section, so that it may be replaced by a new section. It is also important as permitting the variation of the length of the shell or coupling without requiring special machinery for the alteration.

Figure 4:
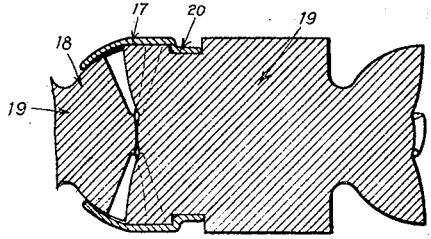
Fig. 4 is a detail longitudinal section of a modified form of coupling sleeve mounting, in which the sleeve or shell is rigidly secured to one end of a shaft section by being spun into a peripheral groove thereon.

In Fig. 4, the coupling sleeve or shell 17 embraces and conforms with the spherical end 18 of a shaft section 19, and is rigidly secured to the adjacent end of the next shaft section 19, by being spun in at 20 around a peripheral groove or depression. This rigid attachment of the coupling shell 17 with the shaft section 19 is shown merely to illustrate the general principle of permanent attachment and is not to be taken as confining this feature of the invention to the exact expedient here employed for securing this result. The simplicity of construction over the construction shown in my above mentioned prior application is still retained in this form of the invention, but the ready replacement of a defective section and the variation of the length of the coupling or shaft is, of course, lacking.

Figure 5:
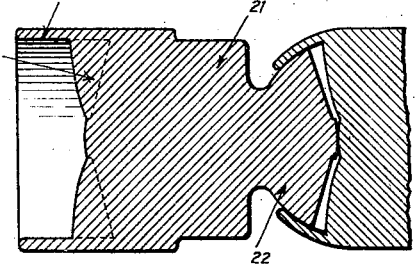
Fig. 5 is a longitudinal section of a further modification in which the coupling shell is formed integral with one end of a shaft section, thus providing a one-piece construction in place of the two-piece constructions illustrated in the other views.

Fig. 5 illustrates a still further simplification in construction. Here the coupling or shaft comprises a succession of units all of a single design, in which the stem 21 has projecting from one end the toothed portion 22 of spherical outer curvature, and has formed in its other end the teeth 23 which are surrounded by the coupling shell 24 which in this instance is integral with the stem 21. The two adjacent units are united together by the shell 24 being wrought over the spherical outer surface of the toothed end 22 as by spinning or otherwise. In this form the same general principle of having the coupling shell rigid with one end of the shaft section, so as to confine the flexing movement of the shaft or coupling to one side of the joint with respect to the shell, is shown, but this form, as well as that illustrated in Fig. 4 lacks the advantages above noted in connection with the replacement and adjustment of the shaft shown in Figs. 1, 2 and 3.

It will be understood that in all of the forms, the engaging surfaces are well lubricated and that the curvature of the outer surface of the toothed ends 11, 18 and 22, as well as that of the bearing surface of shells 14, 17 and 24, is so taken as to permit the joints to rock freely upon the nubs 13. That is to say, the center of curvature is at the intersection of the axis of the shaft section with the surface of the nub 13.

I claim:

1. A flexible coupling, comprising in combination, a pair of shaft sections provided with interengaging toothed ends and axial abutment surfaces, and disposed in general axial alinement but capable of angular displacement with respect to each other, one of the adjacent ends having an outer surface of spherical curvature, and a one-piece coupling shell projecting rigidly from the other adjacent end and embracing and conforming in contour with said spherical surface, the aperture of said projecting shell being of less diameter than portions of the shaft section on either side thereof.

2. A flexible coupling, comprising in combination, a pair of shaft sections provided with interengaging toothed ends, and axial abutment surfaces, and disposed in general axial alinement but capable of angular displacement with respect to each other, one of the adjacent ends having an outer surface of spherical curvature, and a one-piece coupling shell removably mounted upon the adjacent end of the other section and embracing and conforming in contour with said spherical surface, the aperture of said projecting shell being of less diameter than portions of the shaft section on either side thereof.

3. A flexible coupling comprising in combination, shaft sections having interengaging toothed ends and axial abutment surfaces arranged in general axial alinement, one of said ends having an outer surface with spherical curvature centered at the axial abutment, and a one-piece coupling shell projecting rigidly from the end of the other shaft section with an inner surface conforming and contacting with said outer surface of spherical curvature and maintaining said abutment surfaces in constant axial contact, the aperture of said projecting shell being of less diameter than portions of the shaft section on either side thereof.

FREDERIC ECAUBERT.